US012646492B1

(12) United States Patent
Alvarado-Guzman

(10) Patent No.: US 12,646,492 B1
(45) Date of Patent: Jun. 2, 2026

(54) DIGITALLY ENHANCED DIATONIC INSTRUMENT

(71) Applicant: Jose Alvarado-Guzman, Manteca, CA (US)

(72) Inventor: Jose Alvarado-Guzman, Manteca, CA (US)

( * ) Notice: Subject to any disclaimer, the term of this patent is extended or adjusted under 35 U.S.C. 154(b) by 0 days.

(21) Appl. No.: 19/292,064

(22) Filed: Aug. 6, 2025

(51) Int. Cl.
*G10H 1/00* (2006.01)

(52) U.S. Cl.
CPC ..... *G10H 1/0008* (2013.01); *G10H 2220/315* (2013.01); *G10H 2230/245* (2013.01)

(58) Field of Classification Search
CPC ........... G10H 1/0008; G10H 2220/315; G10H 2230/245
See application file for complete search history.

(56) References Cited

U.S. PATENT DOCUMENTS

2017/0323624 A1* 11/2017 Parker ...................... G10H 1/46

FOREIGN PATENT DOCUMENTS

| | | | | |
|---|---|---|---|---|
| FR | 3086092 A1 * | 3/2020 | ............... | G10H 1/38 |
| WO | WO-2005066930 A1 * | 7/2005 | ............... | G10H 1/34 |
| WO | WO-2006050577 A1 * | 5/2006 | ............ | G10H 1/344 |

* cited by examiner

*Primary Examiner* — Jeffrey Donels
(74) *Attorney, Agent, or Firm* — Cynthia S. Lamon; Lamon Patent Services

(57) ABSTRACT

A digitally enhanced diatonic accordion is disclosed, integrating electronic input systems, audio signal processing, and bellows simulation to replicate and expand the expressive capabilities of a traditional accordion. The system includes a matrix of tactile push buttons for note entry, a joystick-based interface for emulating bellows dynamics, and programmable multi-tonal switching between sampled and synthesized sound sources. A digital audio processing pipeline blends input parameters such as note velocity, button state, and bellows motion to produce dynamic audio output through multiple oscillators and wavetables. Onboard signal effects such as reverb and chorus are applied prior to final mixdown. All components are mounted on a compact microcontroller-based printed circuit board featuring multiplexers, capacitors, audio interfaces, and potentiometers for real-time control of tonal blend and volume. The system offers an ergonomic and modular platform for performing, recording, and teaching, while enhancing traditional accordion functionality with digital flexibility and expressive nuance.

13 Claims, 14 Drawing Sheets

DIGITALLY ENHANCED DIATONIC INSTRUMENT

BACKGROUND OF THE INVENTION

1. Field of the Invention

The present disclosure generally relates to electronic musical instruments, and more specifically to a system and method for simulating the functionality of a diatonic accordion using digital controls, wherein a compact electronic device interprets user inputs including tonal selection, button presses, and virtual bellows movement via a joystick to generate musical output and facilitate music learning, practice, and performance through integrated display feedback and recording functionality.

2. Description of Related Art

Learning and performing on a musical instrument like the accordion is a rewarding but often intimidating process, particularly for beginners. The diatonic accordion, while rich in cultural and musical heritage, presents unique challenges due to its physical bulk, mechanical complexity, and fixed key structure. Traditional diatonic accordions are built in a single tuning (e.g., E, F, or G), requiring musicians to purchase and carry multiple instruments to accommodate different musical contexts. The physical operation of the bellows, while expressive, adds another layer of difficulty for new players, requiring both physical coordination and musical sensitivity.

In educational settings, music learners may have limited access to multiple instruments or may struggle to produce consistent sound due to the mechanical bellows. Even in professional settings, switching instruments mid-performance or ensuring accurate articulation across keys can be cumbersome. Attempts to modernize the accordion such as digital MIDI accordions have improved tonal flexibility but often retain the bulky form factor, maintain complex bellows systems, and remain prohibitively expensive.

Moreover, while MIDI controllers and software-based simulators offer portability, they typically lack tactile realism, physical ergonomics, or beginner-friendly guidance. Some incorporate pressure sensors or proximity-based velocity input, but these often require external components or do not respond reliably. Additionally, existing digital accordions rarely offer integrated visual feedback for learners, nor do they support practice and playback modes, dynamic button labeling, or customizable learning interfaces. These limitations hinder both accessibility and usability.

For example, a beginner might own a traditional accordion in a single key, practice in isolation without knowing whether they are playing the right notes or using the bellows correctly, and have no means to record, review, or share their performance. Even advanced users may find it inconvenient to switch instruments or struggle with the portability and physical fatigue associated with long practice sessions.

Additionally, existing solutions do not offer compact, customizable hardware options that match the form factor of modern portable instruments. Many digital accordion alternatives use generic MIDI keyboards or do not offer bellows-style expressive input at all, reducing musical nuance and user engagement.

What is needed is a modern, compact, and digitally enhanced accordion system that maintains the core musical experience of the diatonic accordion while addressing its physical, educational, and functional limitations. This includes the ability to, switch between tonalities (E, F, G) on demand, without swapping instruments, simulate bellows control digitally through intuitive input (e.g., a joystick), provide real-time visual feedback for notes, button presses, and bellows direction, support recording and playback, including MIDI output for use in DAWs, and enhance the learning experience with guided practice modes, file management tools, and ergonomic design suitable for all levels of players.

SUMMARY

In an embodiment, a digitally enhanced diatonic accordion system is disclosed, herein referred to as the DCORDION 100, which integrates tactile user interfaces, programmable audio synthesis pathways, and digitally controlled dynamics to replicate and extend the expressive capabilities of a traditional accordion. The system includes a structured matrix of note buttons, multi-tonal switching architecture, and a joystick-based bellows simulation module for expressive control of note velocity and articulation.

In one embodiment, the system comprises a front-facing control panel equipped with a 34-button array, wherein each button is configured with precision dimensions, optional rubber O-rings for tactile dampening, and internal mounting notches to aid in mechanical assembly. The buttons are integrated into a responsive input grid and are operatively connected to a microcontroller PCB via multiplexed signal channels.

The audio processing path includes audio signal flow architecture. Inputs such as tone selection, bellows position, and button presses are interpreted by the system's logic engine for velocity and note selection. Synthesized voices and sample-based wavetable playback are generated using multiple oscillators and blended via a digital crossfader. Signal effects such as reverb and chorus are selectively applied before final volume control and audio output. The blend potentiometer and volume potentiometer allow the user to adjust the tonal texture between synthesized and acoustic samples.

In another embodiment, the invention includes a microcontroller PCB assembly, which houses essential components including a TEENSY™ 4.1 microcontroller, multiplexers, signal-conditioning capacitors, audio output jacks, and control knobs. The system supports both analog and digital signal routing. Ceramic capacitors are employed near each multiplexer to stabilize voltage and reduce electromagnetic interference.

A joystick interface is electrically coupled to a bellows-simulating joystick, allowing dynamic modulation of note expression by detecting pressure and direction, replicating traditional bellows mechanics in a compact, digital format. The joystick's input is interpreted by the microcontroller to influence note velocity in real-time, adding a tactile performance layer.

In one configuration, the system allows users to blend between pre-sampled accordion tones and synthesized waveforms using a front-panel blend potentiometer, while overall output gain is managed by a volume control. Auxiliary functions, such as tone selection or menu navigation, are executed using dedicated push buttons located on the microcontroller board.

Power is supplied via a +5V regulated input with diode protection to prevent damage from incorrect polarity or overvoltage. Mounting holes positioned at PCB corners ensure secure attachment within the enclosure of the accordion body.

The invention provides a unified digital architecture that emulates traditional acoustic expressiveness while enabling expanded tonal, dynamic, and ergonomic flexibility. By combining tactile controls, real-time modulation, customizable tonal profiles, and robust signal processing, the DCORDION addresses the limitations of existing electronic accordions and offers a scalable platform for performance, recording, and educational applications.

The features and advantages described in the specification are not all-inclusive. In particular, many additional features and advantages will be apparent to one of ordinary skill in the art in view of the drawings, specification, and claims. Moreover, it should be noted that the language used in the specification has been principally selected for readability and instructional purposes and may not have been selected to delineate or circumscribe the disclosed subject matter.

BRIEF DESCRIPTION OF THE SEVERAL VIEWS OF THE DRAWINGS

The following detailed description, is better understood when read in conjunction with the accompanying drawings. The accompanying drawings, which are incorporated herein and form part of the specification, illustrate a plurality of embodiments and, together with the description, further serve to explain the principles involved and to enable a person skilled in the relevant art(s) to make and use the disclosed technologies

The figures and the following description describe certain embodiments, one skilled in the art will readily recognize from the following description that alternative embodiments of the structures and methods illustrated herein may be employed without departing from the principles and scope of the invention described herein. Reference will now be made in detail to several embodiments, examples of which are illustrated in the accompanying figures. It is noted that wherever practicable similar or like reference numbers may be used in the figures to indicate similar or like functionality.

DETAILED DESCRIPTION OF THE INVENTION

The detailed description set forth below in connection with the appended drawings is intended as a description of configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The figures and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures to indicate similar or like functionality.

The present disclosure relates to a compact, digitally-enhanced musical instrument referred to herein as "DCORDION," designed to replicate and expand upon the functionality of a traditional diatonic accordion. The instrument features a 34-note button interface, dynamic tone switching, a joystick-based velocity control system simulating bellows action, and an interactive display for instructional and performance feedback. DCORDION also includes multi-mode functionality for practice, playback, and recording, as well as QWERTY keyboard capabilities and file management. Its design integrates modern connectivity, sound blending, and ergonomic enhancements to provide an intuitive, portable, and versatile solution for both novice and experienced players.

Figure 1:
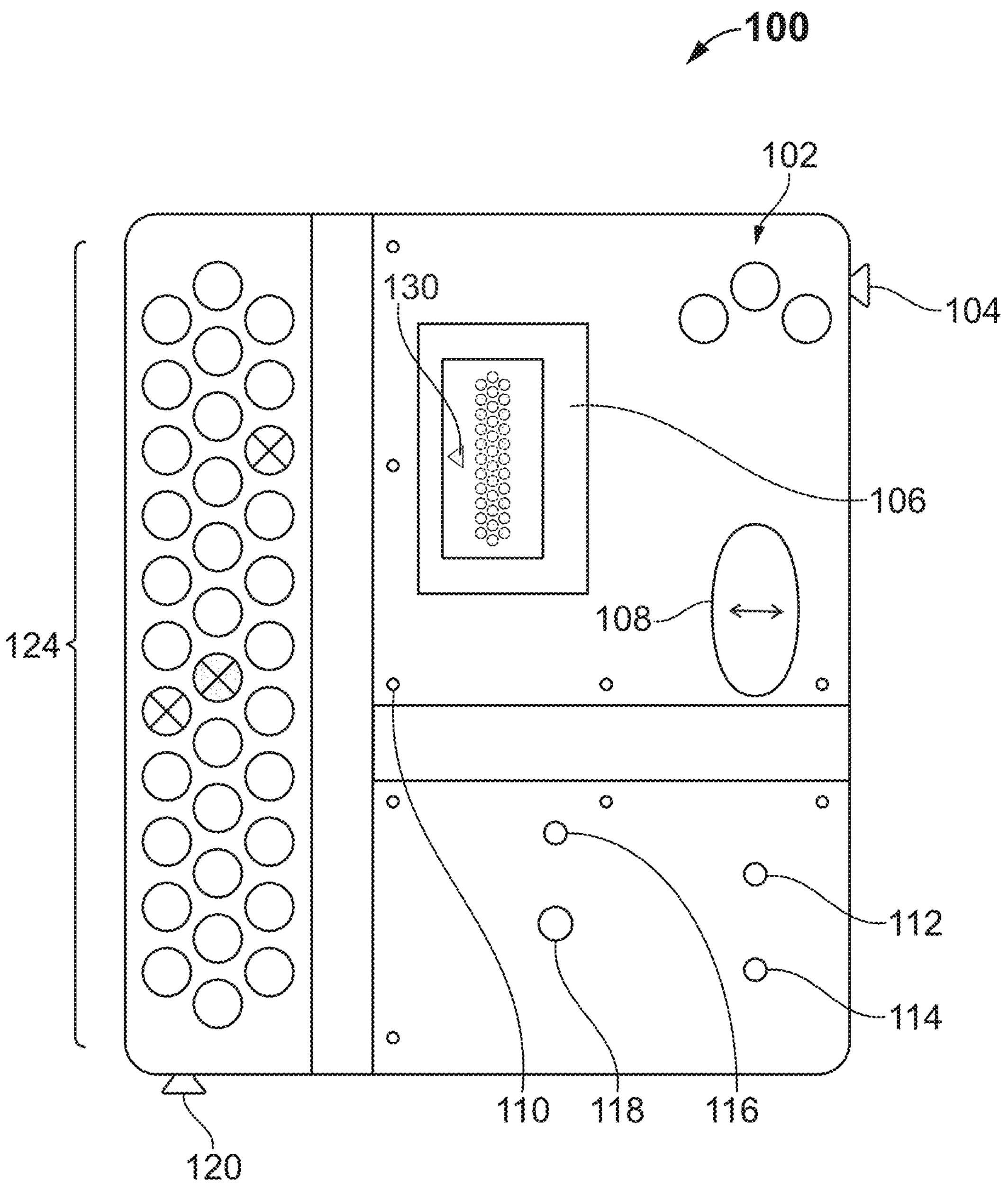
FIG. 1 illustrates a front view of an exemplary embodiment of the digital accordion, herein referred as DCORDION.

FIG. 1 illustrates a front view of an exemplary embodiment of the digital accordion system, herein referred to as the DCORDION 100.

The DCORDION 100 comprises a housing which supports various user-interface and functional components designed to replicate and enhance the behavior of a traditional diatonic accordion in a digitally integrated format.

A set of three tone buttons 102 is provided near the upper-right corner of the front panel. The buttons may serve dual functions as tone selectors (e.g., toggling between tonalities such as E, F, and G) and as menu navigation inputs within the embedded system interface.

Adjacent to the tone buttons is a strap holder 104, positioned to enable attachment of a shoulder or neck strap. A corresponding lower strap holder 120 is disposed near the bottom-left corner of the housing to facilitate secure mounting of a single strap for stable support during operation.

A screen 106 is centrally located on the front panel. The screen is configured to display note input, bellows direction 130, learning modes, menu selection, system menus, and playback feedback. As shown, the screen may visually indicate which notes are being played and the direction of bellows emulation 130 through graphical feedback. In one embodiment the screen 106 may be between 2 and 3 inches. The screen may be an OLED screen or Mini-LED, QLED, ULED, and high-end LED-LCD screen.

Below the screen 106 is a joystick handle 108, which emulates the function of bellows by detecting directional movement and magnitude. In one exemplary use, the joystick may be moved to the right, as indicated in the figure, to simulate bellows expansion. The joystick is used to control the velocity and expression of notes being played.

The front panel also includes multiple mounting points such as M3 flat screws 110 which secure the screen enclosure and internal electronics to the housing.

Below the joystick handle 108, a sound blend knob 112 and a volume knob 114 are provided. The sound blend knob allows the user to adjust the mix between an accordion sound font and a synthesized accordion signal generated by internal sound oscillators. The volume knob adjusts the master audio output level.

Below these controls, a power switch 116 is provided to activate or deactivate the device. A ¼-inch amplifier jack 118 allows connection to external audio amplification equipment or signal processing devices such as pedals or mixers.

Along the bottom edge of the instrument, a USB Type-C port 122 (not shown in FIG. 1) is provided for charging the internal battery and facilitating firmware updates or data transfer, if applicable.

The left portion of the front panel comprises an array of thirty-four (34) note buttons 124, arranged in a diatonic button layout consistent with traditional accordions. The figure indicates the locations of selected note buttons being pressed via finger contact with markers (e.g., X) for clarity. The buttons are configured to register musical input and may also function as a text input interface (e.g., for naming files) when operated in specific modes.

Located near the upper center portion of the panel is a microSD card slot 126 (not shown in FIG. 1) to support removable data storage for MIDI recordings, system configuration files, and song playback libraries.

Additionally, a 3.5 mm audio jack 128 (not shown in FIG. 1) is disposed along the top edge of the panel to enable headphone output or auxiliary line-out connectivity for private listening or direct recording.

Collectively, the components illustrated in FIG. 1 provide a compact, ergonomic, and digitally versatile musical instrument capable of supporting multiple tonal ranges, dynamic input via joystick-controlled bellows simulation, and enhanced educational and performance functionalities via the integrated display 106 and modular control system.

Figure 2:
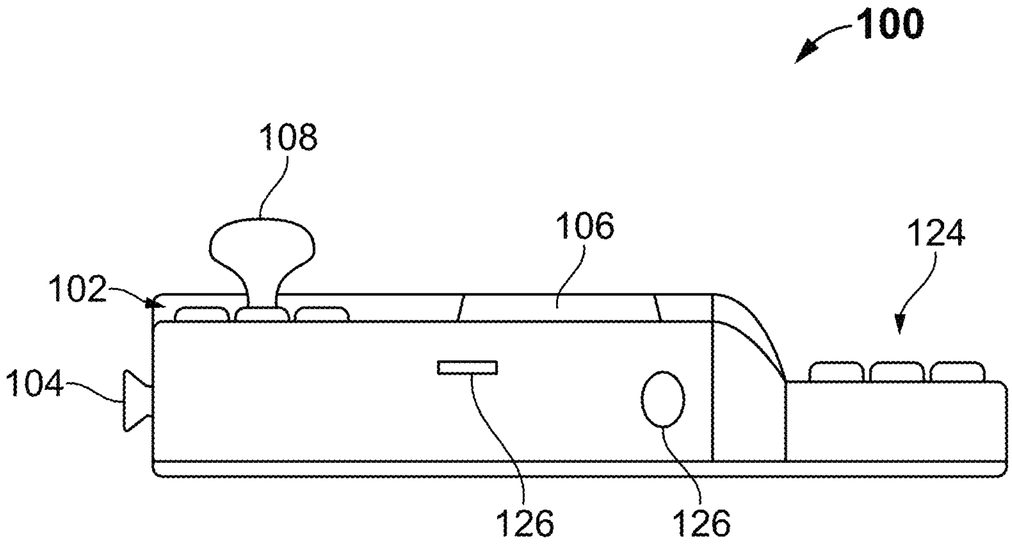
FIG. 2 illustrates a top view of the musical instrument (DCORDION), according to one embodiment of the present invention.

FIG. 2 illustrates a top view of the DCORDION musical instrument 100, according to one embodiment of the present invention, highlighting the spatial arrangement and top-facing components of the device.

As shown, the three tone buttons 102 are located toward the upper-left portion of the device. The buttons serve as both tone selectors and menu navigation controls in various operating modes. Adjacent to the tone buttons is a strap holder 104, configured to secure a wearable strap for stabilizing the instrument during use.

Positioned centrally along the top surface is the joystick handle 108. The joystick handle is configured to simulate traditional accordion bellows action by translating push-pull motion into velocity-based input, which modulates the intensity of the generated sound. Just in front of the joystick handle is the screen 106, which may be a 2.42-inch OLED screen in this embodiment, which provides real-time visual feedback, instructional display modes, and menu navigation interfaces.

Located toward the midsection of the top surface is a micro SD card slot 126. The slot allows for the insertion and removal of a micro SD card used for recording and playback of performance data and storing song files. To the right of the micro SD card slot is a 3.5 mm audio jack 128, enabling private listening through headphones or external amplification.

On the right-hand side of the device are the 34 note buttons 124, arranged in a button grid formation. The buttons are operable by the user to produce musical notes, and their configuration corresponds to that of a diatonic accordion.

Figure 3:
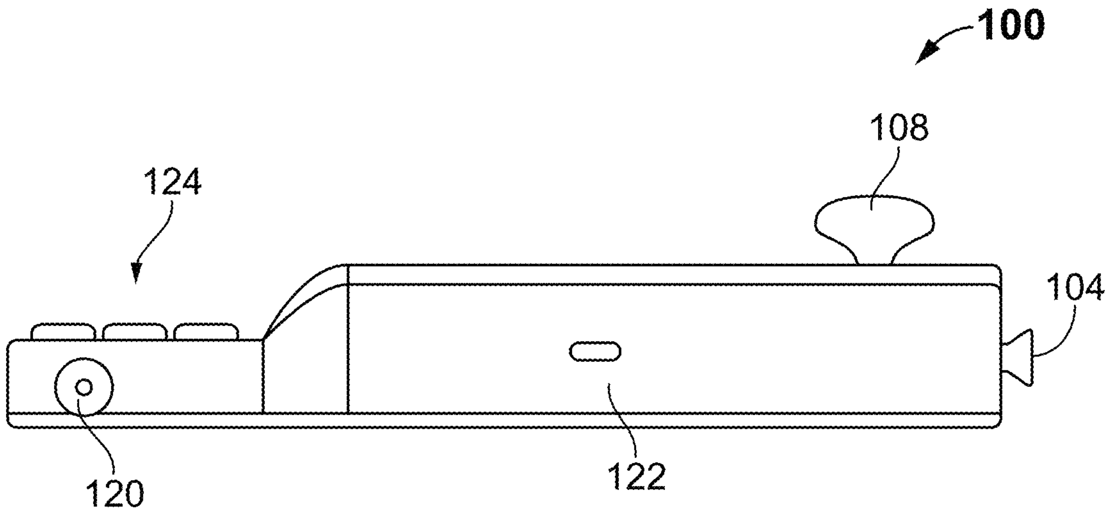
FIG. 3 illustrates a bottom view of an exemplary musical instrument system (DCORDION), according to one embodiment of the present invention.

FIG. 3 illustrates a bottom view of an exemplary musical instrument system 100, according to one embodiment of the present invention. In this view, the lower structural configuration of the device is shown, providing visibility into components not fully depicted in other perspectives.

The bottom side of the housing includes a first strap holder 120 located on the left side and a second strap holder 104 on the right side. These strap holders are configured to receive a shoulder or neck strap for hands-free support during musical performance.

A USB Type-C charging port 122 is centrally located along the bottom surface of the instrument and facilitates high-speed charging and data transfer between the musical instrument system 100 and an external computing or power source. The port 122 is recessed slightly to protect against accidental damage and to maintain a streamlined exterior profile.

On one lateral side, a plurality of note buttons 124 specifically thirty-four in total extend partially to the bottom edge and are observable from this angle. The note buttons 124 are configured to be pressed by the user to produce musical tones and are preferably pressure-sensitive to support expressive control.

A joystick handle 108 extends vertically from the top portion but remains visible in the bottom perspective. The joystick handle 108 allows for real-time modulation of sound parameters, such as pitch bending or vibrato, by detecting user-directed directional input.

Figure 4:
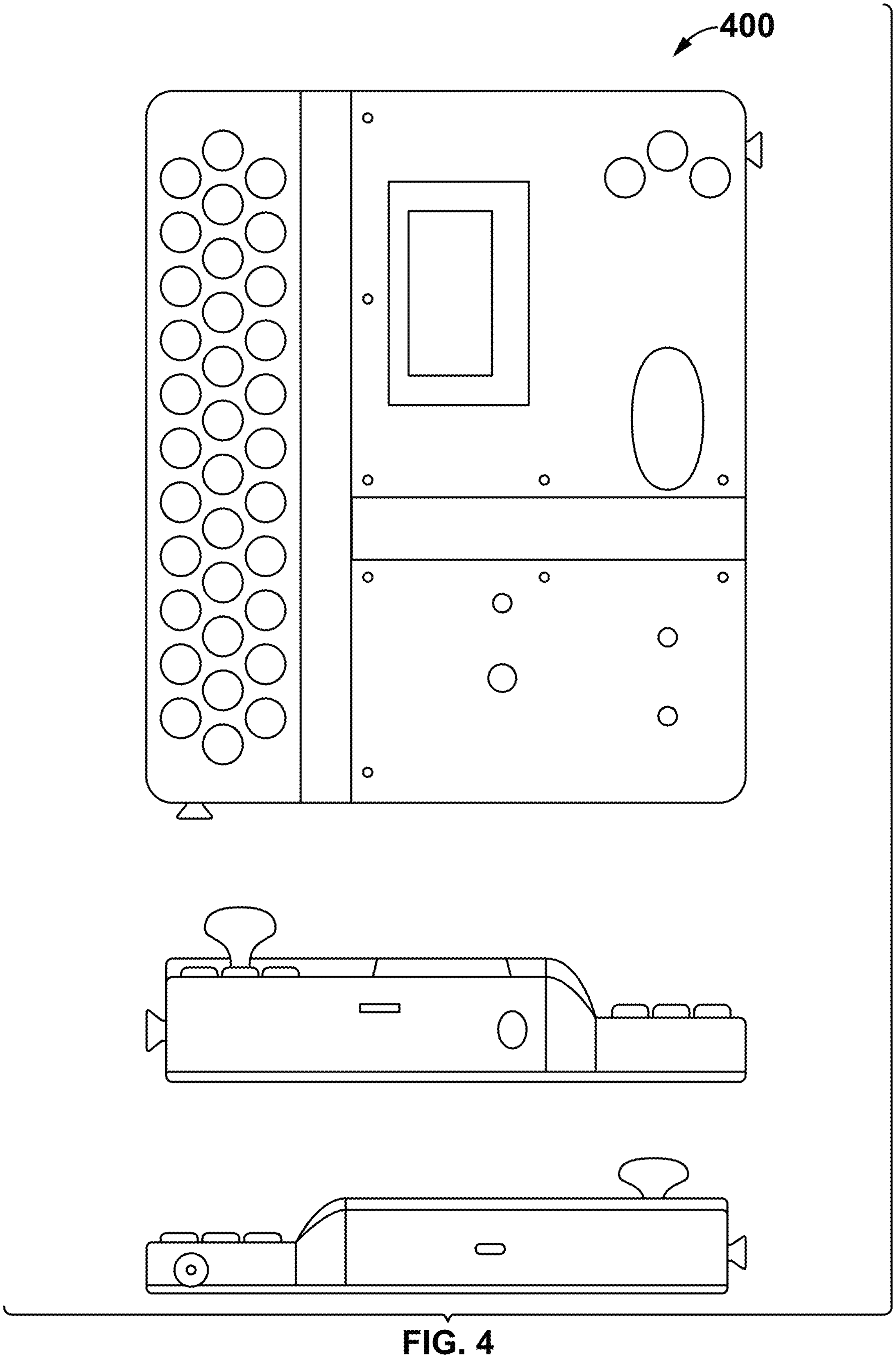
FIG. 4 illustrates dimensional views of an exemplary embodiment of a musical instrument system (DCORDION)

FIG. 4 illustrates dimensional views of an exemplary embodiment of a musical instrument system 400 referred to herein as a digital chord-based accordion or "Dcordion." The figure includes a front view, a top view, and a bottom view, each annotated with structural measurements to indicate the physical footprint of the device. The front view shows the planar face of the device, which measures approximately 250 millimeters in height and 210 millimeters in width. The face includes the visible arrangement of thirty-four note buttons, a rectangular display region configured to house the screen 106, and various additional control inputs and ports, such as tone buttons, navigation buttons, joystick, and knobs (not labeled in this view, as previously described with reference to FIG. 1).

The top view reveals the upper surface of the musical instrument system 400. From this perspective, the vertical height of the device may be approximately 29 millimeters at its highest point, tapering down to 18 millimeters at one end. Key structural elements such as the joystick handle, audio jack port, and top-facing control interfaces are depicted in their relative vertical alignment, though not individually labeled in this figure, as previously described with reference to FIG. 2. Although specific measurements are described, the invention is not limited to these measurements.

The bottom view shows the underside of the device, which includes a centrally positioned USB Type-C port (not explicitly labeled in this figure and previously described in FIGS. 1 and 3) and strap holders located at either lateral end. The vertical elevation from the surface to the bottom-most plane is indicated as approximately 3 millimeters at the thinnest section and 34.1 millimeters at the thickest section, accommodating internal electronic components and structural design requirements.

Figure 5:
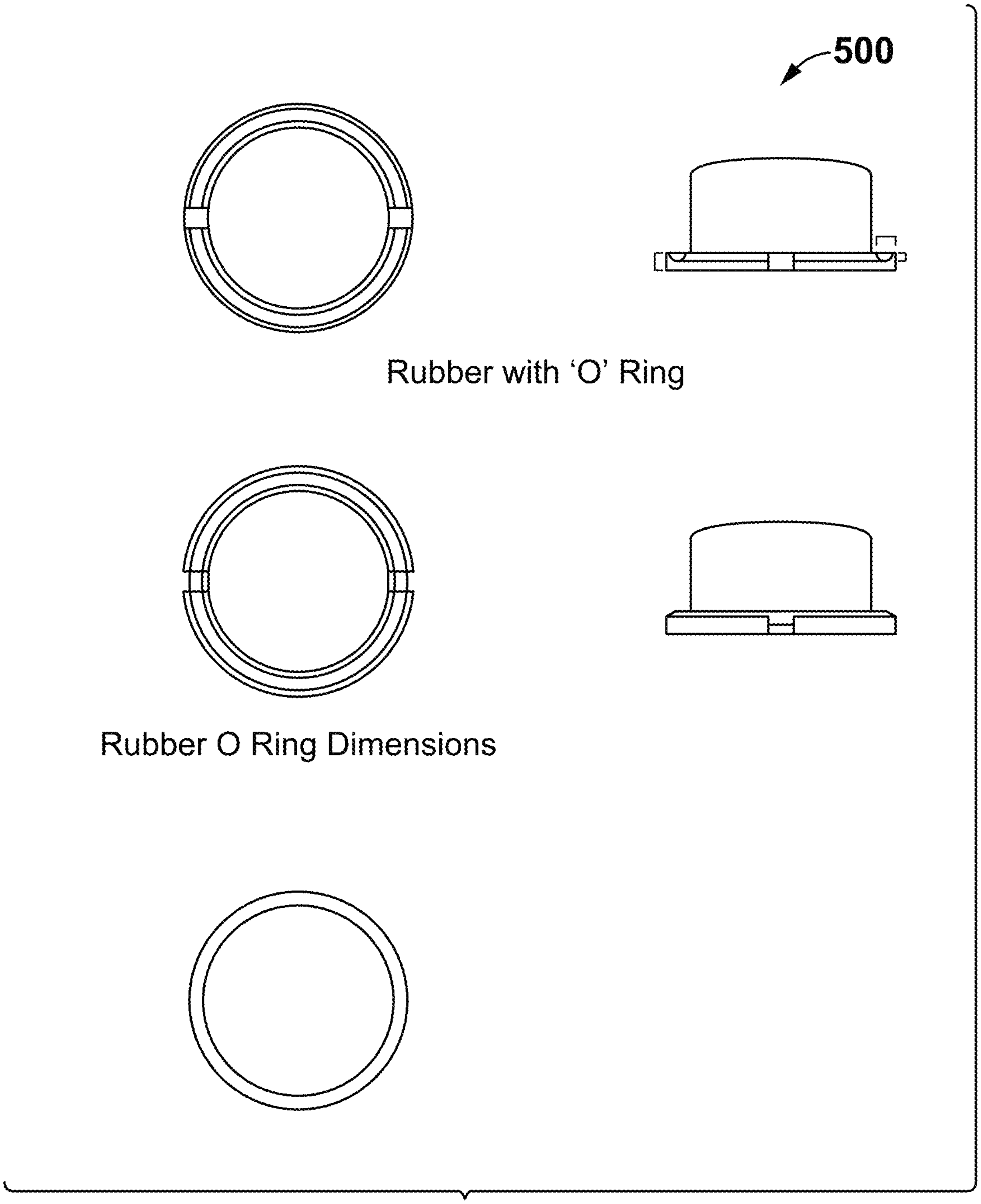
FIG. 5 illustrates various views and dimensional specifications of a button assembly, including the button design, integration with an O-ring, and the O-ring itself, according to one embodiment of the present invention.

FIG. 5 illustrates various views and dimensional specifications of a button assembly 500, including the button design, integration with an O-ring, and the O-ring itself, according to one embodiment of the present invention. The button shown in FIG. 5 corresponds to the same type of button already labeled and described in FIGS. 1 through 4.

The top left portion of FIG. 5 depicts a top view of the button, which comprises a generally circular structure having an outer diameter of approximately 16.5 mm. The circular profile includes two symmetric notches at the periphery to accommodate secure alignment within the device housing.

Adjacent to the top view, a side sectional view of the button is shown. The button includes a dome-shaped upper surface having a diameter of approximately 13 mm and a height of about 8.1 mm. The main dome region is elevated by approximately 1 mm above a mounting base that extends 2 mm in width. The mounting base further includes a lip having a thickness of approximately 0.5 mm, intended to engage with the top surface of the underlying housing, and a downward protrusion of about 1.2 mm for securing the button in place and facilitating actuation. The features ensure tactile responsiveness and ease of assembly.

The central portion of FIG. 5 illustrates the button with an integrated O-ring mounted around its periphery. The O-ring is shown to nest securely within a recessed groove formed around the circular circumference of the button. The configuration enables a snug fit when the button is inserted into a corresponding aperture in the device, providing damping and minimizing lateral motion during use.

To the right of the button-O-ring assembly, a further side sectional view is provided. The view emphasizes a mounting notch formed along the button's base, which is dimensioned to ease post-fabrication sanding or finishing operations. The notch acts as a guide for controlled removal of surface imperfections or support structures resulting from a manufacturing process such as injection molding or 3D printing.

The bottom portion of FIG. 5 presents a top view and sectional profile of the O-ring itself. The O-ring is a flexible, circular gasket having an inner diameter of approximately 14 mm and an outer diameter of approximately 16 mm, resulting in a width of 1 mm. The O-ring is preferably fabricated from an elastomeric material such as rubber or silicone and functions as a buffer to reduce rattle, absorb mechanical shock, and enhance the return feel of the button after actuation.

Figure 6:
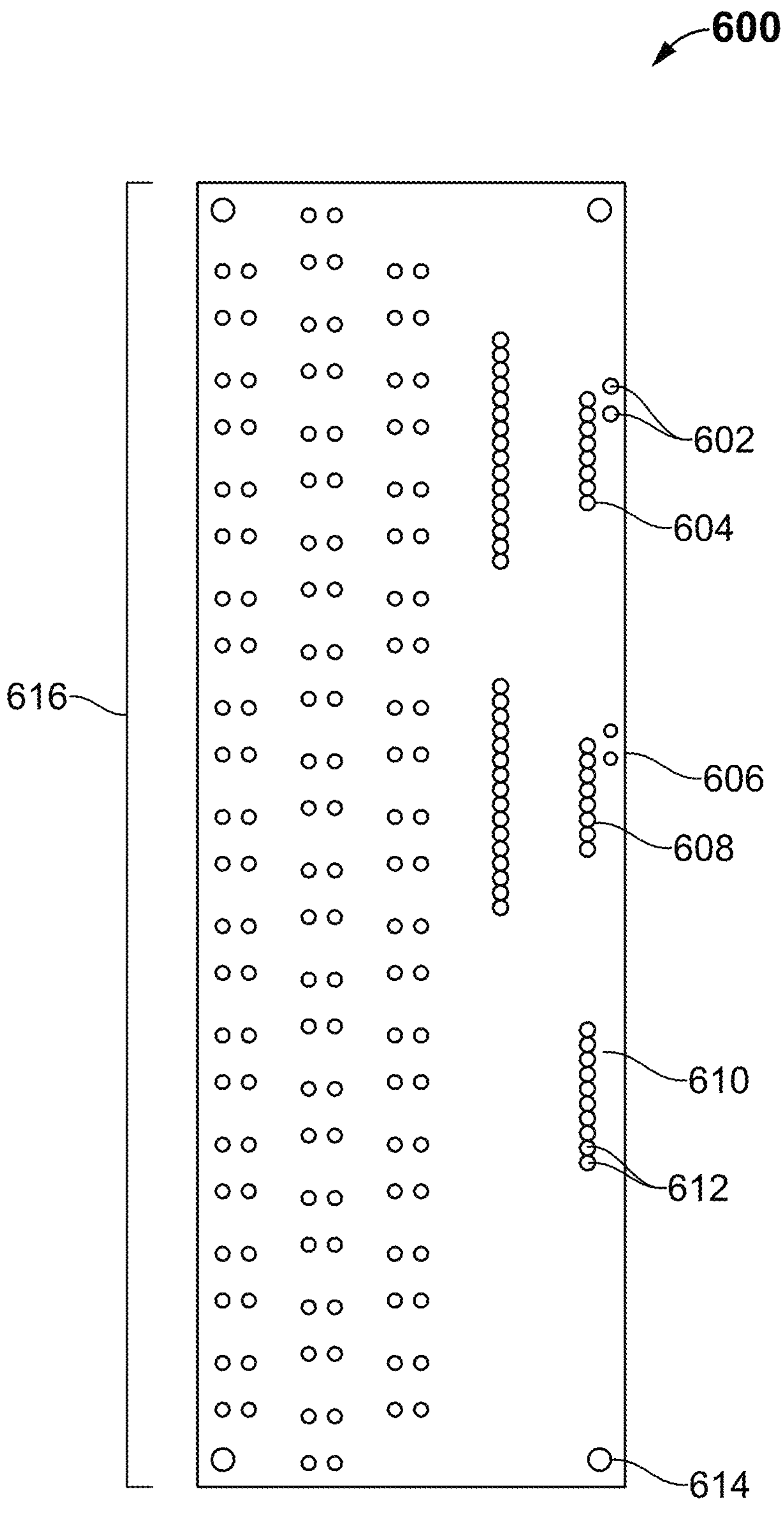
FIG. 6 illustrates an overhead view of the microcontroller printed circuit board (PCB) assembly for the DCORDION, according to one embodiment of the present invention.

FIG. 6 illustrates an overhead view of the microcontroller printed circuit board (PCB) assembly 600 for the DCORDION 100, according to one embodiment of the present invention, detailing component placements, dimensions, and mounting features.

The PCB assembly 600 includes a plurality of electronic components and mechanical elements necessary for processing input signals from multiple buttons and multiplexing channels.

At the upper portion of the PCB, a first ceramic capacitor 602, identified as a 104 ceramic capacitor, is positioned adjacent to a first 16-channel multiplexer 604. The configuration is repeated at the midsection of the PCB where a second 104 ceramic capacitor 606 is placed in proximity to a second 16-channel multiplexer 608. The capacitors 602 and 606 serve as decoupling elements, stabilizing the power supply for the corresponding multiplexers 604 and 608.

A third component region includes a pair of 16-channel input/output multiplexers 610, responsible for processing signals from the note buttons and routing them to the microcontroller. The multiplexers 610 are aligned vertically on the PCB to minimize trace length and interference.

The lower section of the PCB assembly 600 shows a designated region for the placement of buttons 33 and 34, collectively identified as component 612. The buttons are part of the 34-button input array and are used for note input and auxiliary functions such as menu navigation.

At each corner of the PCB assembly 600 are M3 mounting holes 614, which provide mechanical attachment points for securing the PCB to the internal chassis or enclosure of the accordion instrument.

Along the left edge of the PCB, a matrix of 8 mm silicone push buttons 616 is arranged in a grid format. The buttons 616 correspond to the note input interface and are actuated by the user during musical performance. The spacing and layout of the buttons 616 are optimized for ergonomic interaction and are electronically interfaced with the multiplexers 604, 608, and 610 for signal acquisition.

The overall dimensions of the PCB assembly 600 are approximately 227.5 mm in height and 75 mm in width. A spacing of 15 mm is maintained between the upper edge and the first set of components, and a gap of 19 mm is defined between the last row of buttons and the lower edge of the board to accommodate wiring and enclosure constraints.

Figure 7:
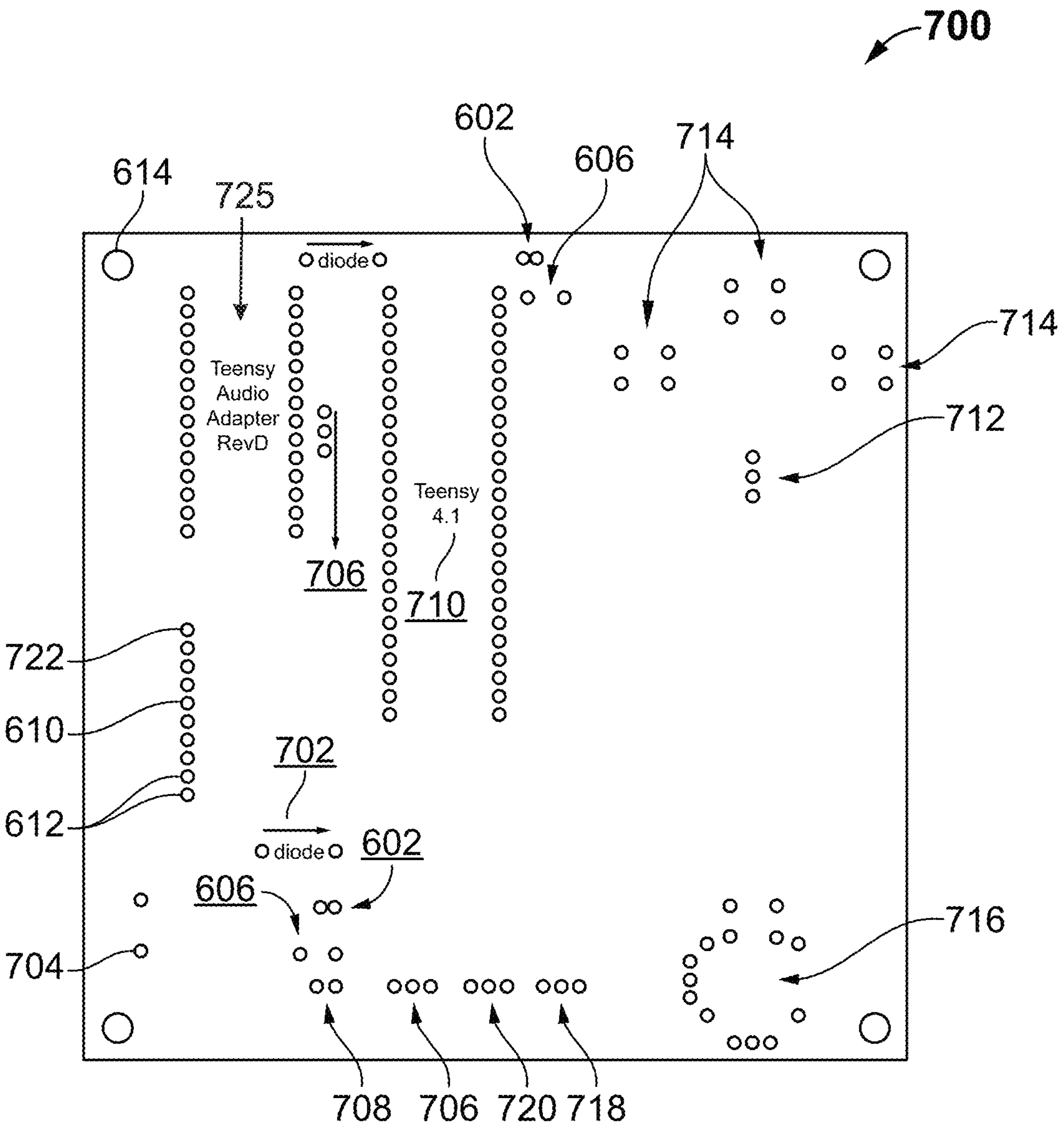
FIG. 7 illustrates a top-down view of an internal microcontroller PCB layout for the DCORDION, according to one embodiment of the present invention.

FIG. 7 illustrates a top-down view of an internal microcontroller PCB layout 700 for the DCORDION 100, according to one embodiment of the present invention. The layout represents the rear-facing electrical interface and control circuit configuration responsible for managing user input, sound processing, and output functionality.

The PCB 700 includes a plurality of M3 mounting holes 614 located at the corners of the rectangular substrate, which is approximately 115 mm in width and 116 mm in height. The mounting holes 614 are configured to receive fasteners for mechanical attachment of the PCB 700 to an enclosure or housing.

Power is supplied via a 5V battery connection terminal 708 located at the lower left portion of the PCB 700. Adjacent to the power input is a diode 702 positioned in-line to protect against reverse polarity conditions. A ground terminal 704 is also provided in proximity to the power input to complete the power circuit.

Located centrally on the PCB 700 is a microcontroller 710, which is configured to process user input signals, control audio synthesis, and manage other onboard functions. In this example, the microcontroller is a TEENSY™ 4.1 microcontroller and is electrically coupled to various input electrodes and analog components distributed across the board. In this embodiment, an audio adapter 725 is mounted on the PCB 700. In this example the audio adapter may be a TEENSY™ Audio Adaptor, although any type of adapter may suffice as long as it functions in a similar fashion. The audio adapter 725 acts as a high-quality digital-to-analog converter (DAC), taking digital audio samples from the TEENSY™ 4.1 and converting them to analog voltages for audio output.

A line out terminal 706 from the audio adapter 725 is positioned adjacent to the TEENSY™ 4.1 microcontroller 710 and labeled "LGR." The terminal 706 provides an analog output signal suitable for connection to external amplification or recording equipment. Additionally, The display is electrically connected to the microcontroller 710 via the SPI (Serial Peripheral Interface) communication protocol, utilizing the microcontroller's dedicated SPI pins for data transmission and control signals A matrix of thirty-four button electrodes 722 is disposed in the left-central portion of the PCB 700. The electrodes 722 are arranged in a linear array to receive touch or mechanical input from note buttons (see FIG. 1) and are divided into two control groups. A first group of thirty-two button electrodes is interfaced with two multiplexers 610, which are mounted below the button matrix. A second group comprising two button electrodes 612 is separately interfaced to the microcontroller 710, enabling simultaneous monitoring without multiplexing.

Various passive circuit elements are arranged throughout the PCB 700. They include a plurality of electrolytic capacitors 602, which provide power supply filtering, and ceramic capacitors 606 that assist in signal decoupling and noise suppression.

At the lower edge of the PCB 700, two rotary potentiometers are positioned. A volume potentiometer 718 is used to adjust the output gain of the audio signal, while a blend potentiometer 720 controls the balance or mix between multiple signal paths or sources.

Toward the bottom right corner, a joystick electrode array 716 is shown, comprising contact points corresponding to directional movement of a joystick handle (see FIG. 1). When the joystick is actuated in a given direction, one or more of the electrodes 716 are contacted, generating signals interpretable by the microcontroller 710 for directional input.

Also shown is an unused slide switch 712 and a group of 6 mm pushbutton electrodes 714 arranged in the upper right portion of the PCB 700. The buttons 714 can be configured for additional input functionality such as mode selection, control toggling, or menu navigation.

All referenced electrode structures in FIG. 700 have been assigned reference numerals in the 700 series to clearly distinguish them from the mechanical controls and external user interface elements illustrated in other figures, such as FIG. 1. This ensures unambiguous reference between the electrode contacts and their corresponding functional components.

Figure 8:
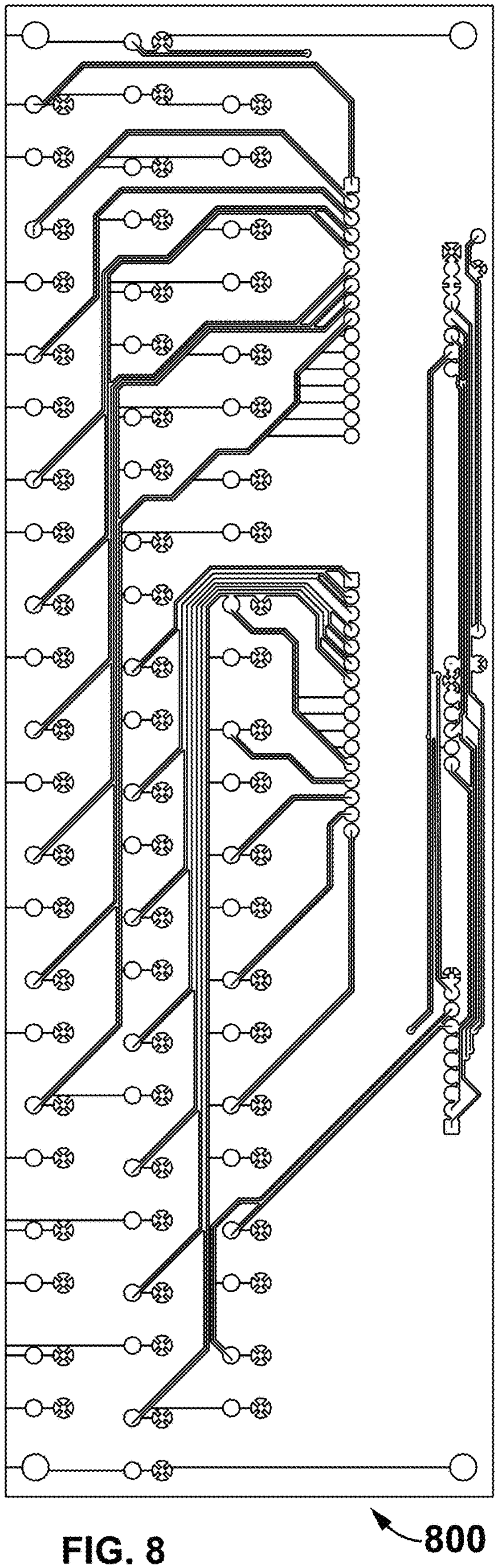
FIG. 8 illustrates a rear perspective view of a printed circuit board (PCB) layout utilized in the DCORDION, corresponding to the internal microcontroller and input/output control system as shown in FIG. 6.

FIG. 8 illustrates a rear perspective view of a printed circuit board (PCB) layout 800 utilized in the DCORDION 100, corresponding to the internal microcontroller and input/output control system as shown in FIG. 6.

The PCB 800 comprises a multilayer substrate configured for signal routing, power distribution, and component interconnection. The rear surface view depicted in FIG. 8 highlights the copper trace network and through-hole vias used for establishing electrical connectivity between the mounted components on the front surface of the PCB and the underlying circuit infrastructure.

A plurality of through-hole vias is arranged in a vertical and grid-like pattern, each configured to receive pin headers or leaded components such as multiplexers, ceramic capacitors, input/output channels, and button arrays. The placement and distribution of the vias correspond directly to the component layout previously shown in FIG. 6.

The board features multiple signal routing traces, primarily depicted in blue and red, which represent different layers of the PCB. The red traces denote the top copper layer, while the blue traces indicate signal paths on an internal or bottom copper layer. The traces form a complex routing network interconnecting multiplexed button signals, microcontroller inputs, and peripheral interface circuits.

The right lateral region of the PCB 800 includes vertical trace clusters corresponding to the pinout of two 16-channel input/output chips and associated ceramic capacitors. The traces are configured to route multiplexed button data and output control signals between the processing core and peripheral interfaces.

Two circular apertures are provided at opposite diagonal corners of the PCB 800 to accommodate M3 mounting screws, enabling secure mechanical attachment to the internal enclosure of the DCORDION 100.

The overall dimensions and hole pattern of PCB 800 are consistent with those shown in FIG. 6, measuring approximately 227.5 mm in height and 75 mm in width. The board's form factor ensures compatibility with the ergonomic constraints of the DCORDION housing and allows sufficient routing space for high-density signal integration.

FIG. 8 thus represents the electrically active underside of the microcontroller PCB, showing the implementation of a compact and robust routing topology that supports the full functional range of button input multiplexing, power filtering, and signal integrity management within the digital accordion system.

Figure 9:
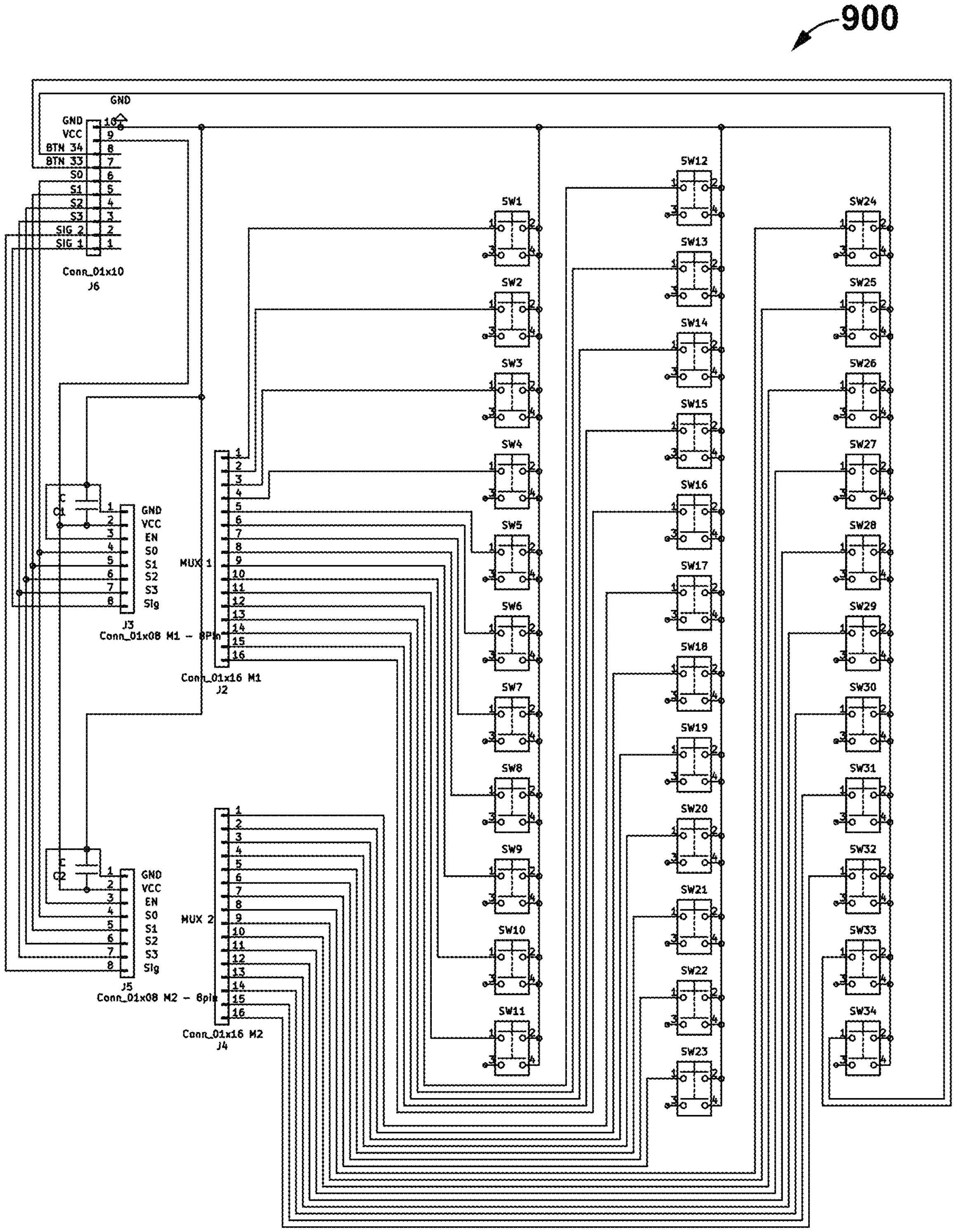
FIG. 9 illustrates a schematic diagram 900 of the input matrix circuit implemented within the DCORDION, according to one embodiment of the present invention.

FIG. 9 illustrates a schematic diagram 900 of the input matrix circuit implemented within the DCORDION 100, according to one embodiment of the present invention. The schematic 900 is configured to register user input from a thirty-four button array via two multiplexers, supporting efficient digital scanning and signal routing to the primary microcontroller.

The circuit 900 comprises a plurality of momentary push-button switches SW1 through SW34 arranged in a structured matrix topology. Each button is configured as a normally-open switch that, when actuated, completes an electrical connection between its corresponding row and column lines. The matrix configuration reduces the number of microcontroller input pins required by organizing the switches into intersecting lines that can be sequentially scanned.

Two 16-channel analog multiplexers (MUX1 and MUX2) are shown connected to the button matrix. The multiplexers, such as the 74HC4067 or similar, are each capable of selecting one of sixteen inputs under digital control from the microcontroller. The input terminals of MUX1 and MUX2 are wired to distinct sets of button rows and columns, allowing scanning across all 34 switch positions with minimal latency.

The multiplexers are interfaced to the main microcontroller via three shared digital address lines (A0, A1, A2), an enable line (EN), and a shared signal output or input depending on read/write configuration. The control lines are labeled accordingly and routed to the appropriate connector terminals shown as headers (e.g., Conn_01x10, Conn_01x08, etc.). Power supply lines (VCC and GND) are connected to all active components to ensure proper operation of digital logic circuits.

Each push-button switch (SW1-SW34) is further illustrated with terminal-level connections, consistent with industry-standard Eagle schematic representations. Diagonal internal contact lines within each switch symbol depict the actuation path, closing the circuit when the switch is pressed.

The headers J1 and J2 provide pin-level connectivity between the button matrix and the multiplexers. The headers may be implemented as male or female pin arrays soldered directly onto the PCB, as described in FIG. 6 and electrically supported by the trace layout shown in FIG. 8.

The entire schematic 900 represents a low-latency, low-pin-count digital input system for registering diatonic note button activations, allowing real-time data acquisition by the embedded processor. The structure enables dynamic musical interaction with high fidelity and minimal debounce complexity, optimized for musical responsiveness in the DCORDION 100.

Figure 10:
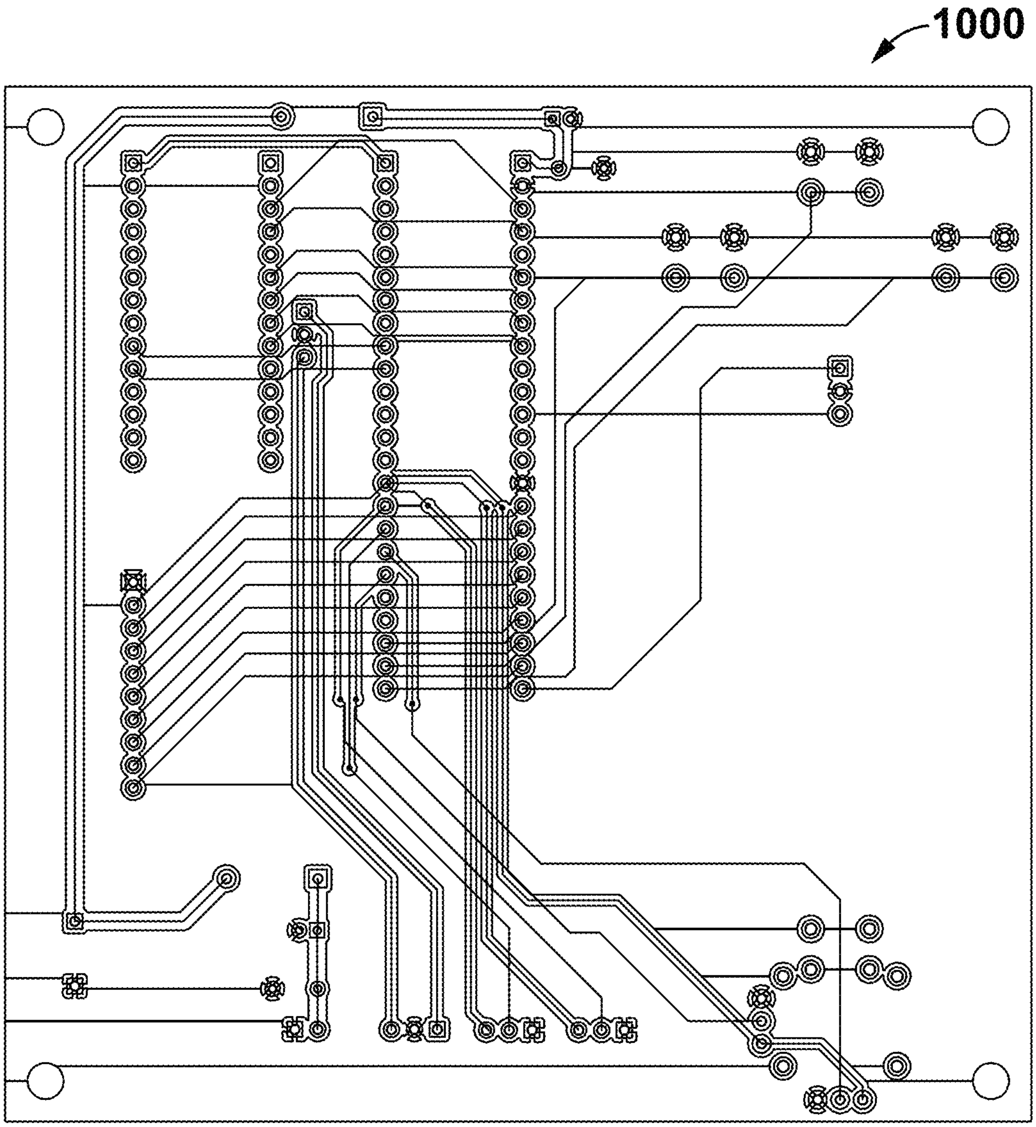
FIG. 10 illustrates an exemplary printed circuit board (PCB) layout for a central controller unit within the DCORDION, according to one embodiment of the present invention.

FIG. 10 illustrates an exemplary printed circuit board (PCB) layout 1000 for a central controller unit within the DCORDION 100, according to one embodiment of the present invention. The figure showing the trace routing and component pad arrangements on at least one layer of the board substrate. The depicted layout corresponds to a mixed-signal control board which interconnects the digital signal processing, power delivery, and multiplexed input/output (I/O) subsystems described in FIGS. 7-9.

As shown in FIG. 10, the PCB 1000 comprises multiple through-hole and surface-mount component pads, including connector pin arrays, power rails, and signal vias. The PCB is fabricated using a multilayer construction, wherein the top signal layer is shown with conductive traces rendered in red. The traces form a plurality of interconnected circuit paths, facilitating communication between peripheral connector arrays, analog-to-digital converter inputs, and multiplexing logic components.

The central region of PCB 1000 includes a dense grid of vertical and horizontal traces that terminate at parallel through-hole connector pads, which may correspond to the output of one or more analog/digital multiplexers (e.g., 74HC4067 or equivalents). The traces route signals from the user input devices (e.g., switches) to the microcontroller or main processing unit mounted on an adjacent or interfacing board.

The upper portion of PCB 1000 features a network of power and signal distribution traces that branch outward to a plurality of pin header pads. The traces may be configured for power input, logic control signals (such as address lines and strobe signals), or output communication protocols (e.g., I2C, SPI, UART).

The lower region of the PCB includes a series of traces extending to a connector footprint configured to interface with other system modules, such as sound synthesis circuits, power supply regulation boards, or USB/MIDI output interfaces. Via transitions and selective pad isolation are employed to reduce electromagnetic interference (EMI) and crosstalk between adjacent signal lines, especially in regions with high-density routing.

Mounting holes are positioned at the four corners of the PCB 1000 to enable secure attachment within the DCORDION enclosure, providing mechanical stability and grounding contact points.

In an exemplary embodiment, the PCB layout 1000 supports modular system architecture, allowing selective replacement, reprogramming, or upgrading of input-processing subsystems without requiring rework of the entire electronic assembly. The layout may be manufactured using standard PCB fabrication techniques, including copper etching, solder mask application (illustrated in blue), and silk-screened labeling for component placement guidance.

Figure 11:
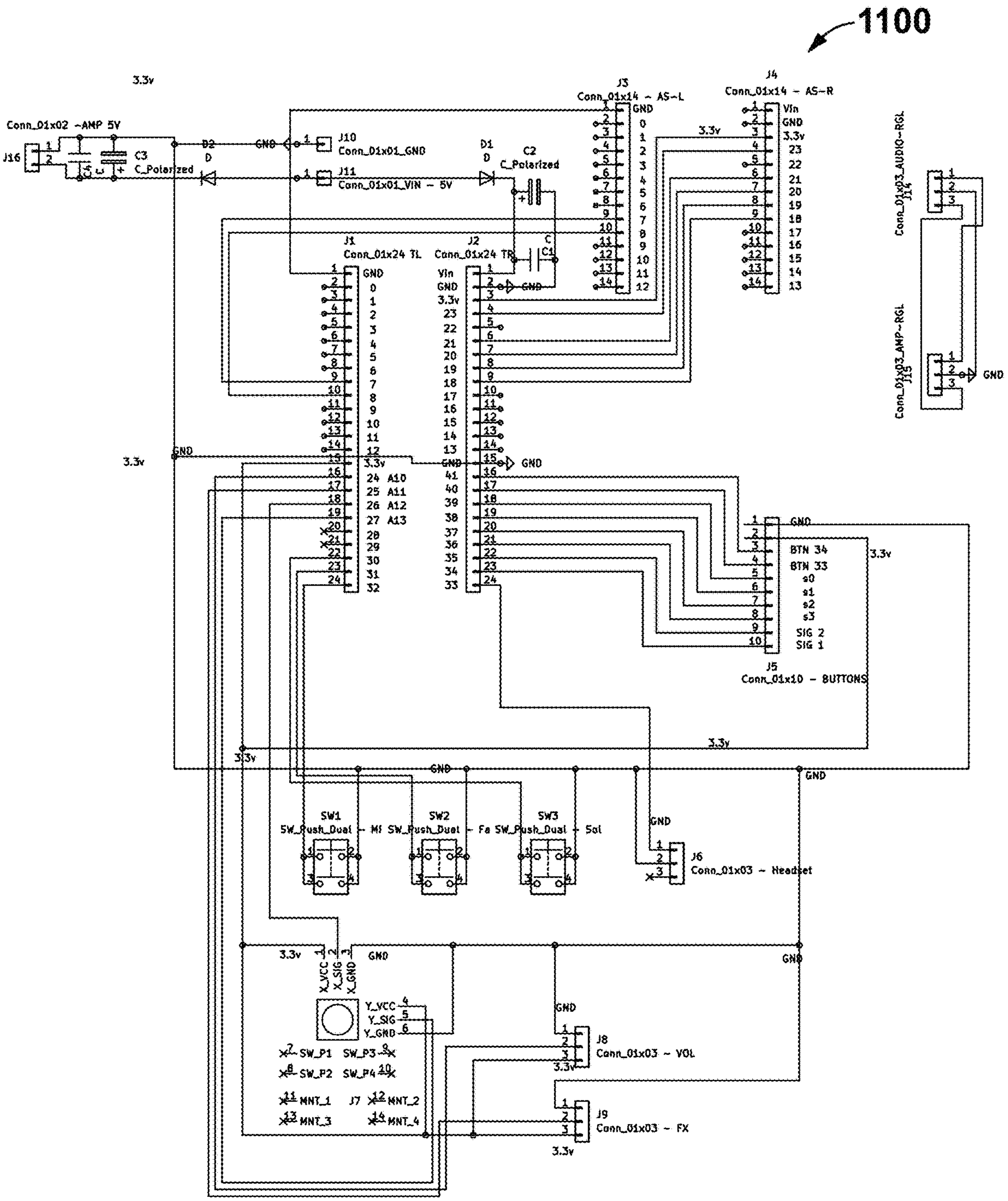
FIG. 11 illustrates an exemplary schematic diagram of a microcontroller-based user interface subsystem.

FIG. 11 illustrates an exemplary schematic diagram 1100 of a microcontroller-based user interface subsystem, forming a portion of the DCORDION electronic system 100, according to one embodiment of the present invention. The schematic 1100 shows interconnections between the microcontroller unit (MCU), power regulation circuitry, button inputs, rotary encoder modules, LED indicators, and various input/output (I/O) connector ports.

As shown in FIG. 11, the schematic includes a microcontroller unit comprising two integrated circuit packages labeled J1 and J2, which collectively provide a set of digital and analog I/O pins. The pins are connected via a series of traces to external components and connectors, including:

A power supply input circuit at the upper left of the figure, comprising a connector J10 labeled Conn_01x02_MMP 3V, a bypass capacitor C1, and a diode D1 for reverse polarity protection. The circuit supplies regulated 3.3V power to the entire subsystem.

Connectors J3 and J4 correspond to pin headers for mounting the audio adapter 725, which interfaces with the microcontroller 710 to provide audio processing capabilities.

A set of tactile switches SW1-SW5 positioned centrally within the schematic. The switches are associated with discrete function controls (e.g., patch change, start/stop, user-defined triggers) and are coupled to GPIO pins of the MCU via pull-down resistors where appropriate.

Connector J5 labeled Conn_01x03 provides a signal path for headphone audio output, while J6 (Conn_01x03) allows interfacing with analog volume control circuits.

The lower-left quadrant shows an encoder input module comprising two rotary encoders SW_R1 and SW_R2 and associated components (e.g., resistors and VCC/GND connections). The rotary encoders are connected to specific digital input pins on the MCU and configured to provide real-time parameter adjustments such as volume, effect depth, or menu navigation.

Additional control modules include BTN connector (J9), labeled Conn_01x10_BUTTONS, which aggregates up to 10 button signals into a bundled interface that is connected to designated I/O pins on the MCU. Connectors J8 and J7 (top right), labeled Conn_01x14 and Conn_01x04, respectively, for auxiliary communication or power distribution to adjacent modular subsystems, such as LED driver boards, MIDI control interfaces, or wireless modules. A signal path to a “VOL” control input (J6) and an “FX” signal path (J9), which correspond to analog or digital control of system volume and effects respectively.

Power and ground signals are distributed via common 3.3V and GND rails as illustrated, ensuring regulated supply to all active components. The schematic further shows capacitive decoupling and logic-level interfacing between the MCU and external components.

In a preferred embodiment, the circuit shown in FIG. 11 allows real-time user interaction with the DCORDION through a low-latency control interface, enabling tactile feedback, rotary parameter modulation, and integrated audio output control. The modularity of the connectors allows the subsystem to be easily expanded or reconfigured depending on application-specific requirements.

Figure 12:
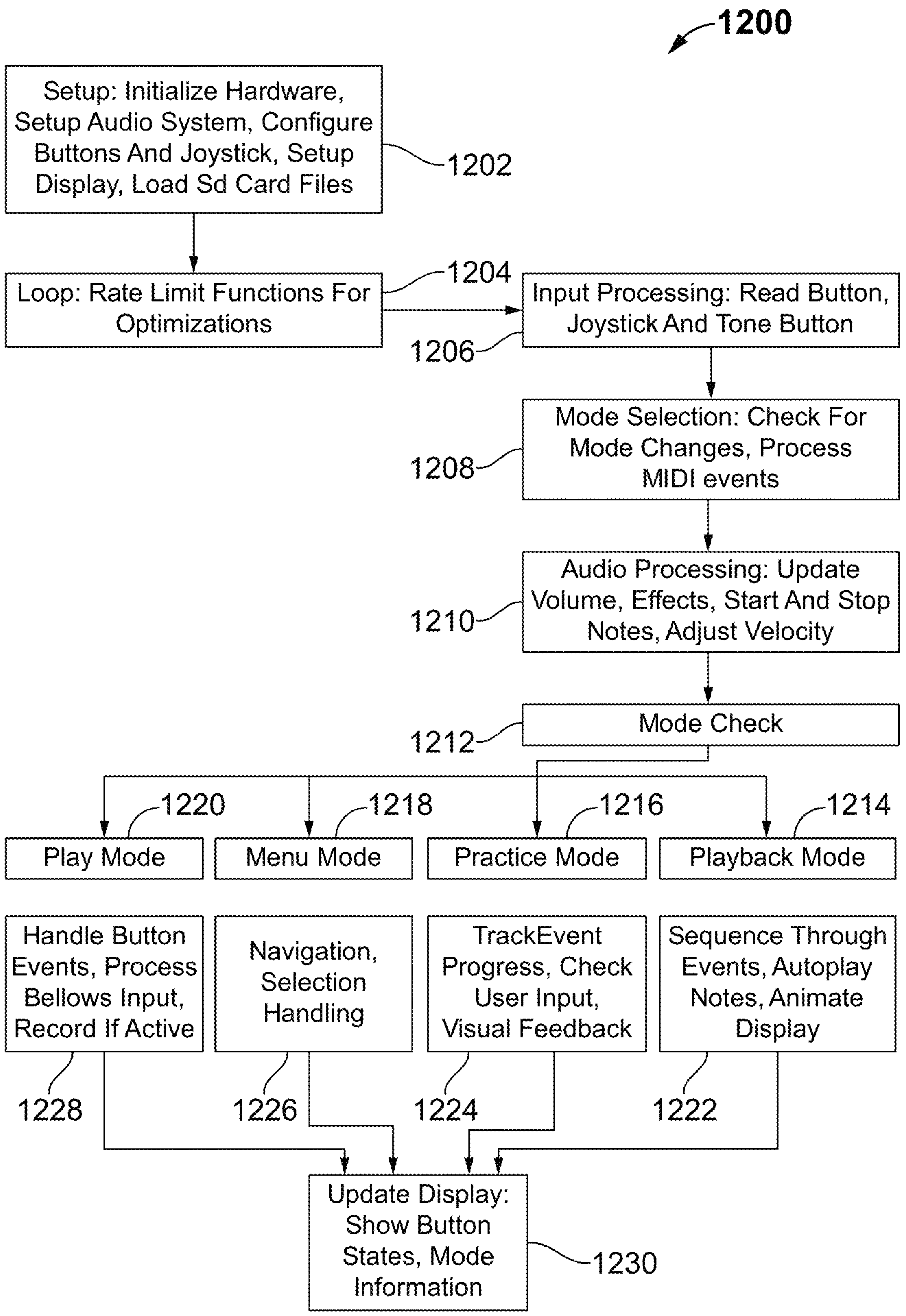
FIG. 12 illustrates a flow diagram depicting the main program flow for controlling the operation of the DCORDION system, according to one embodiment of the present invention.

FIG. 12 illustrates a flow diagram 1200 depicting the main program flow for controlling the operation of the DCORDION system, according to one embodiment of the present invention. The flow begins at block 1202, representing a setup procedure in which hardware is initialized. This includes configuring the audio system, assigning functions to buttons and a joystick, initializing the display, and loading audio or data files from a microSD card.

Following the setup, the system enters a continuous loop at block 1204. The loop enforces rate limiting of certain functions to optimize system performance. The program proceeds to block 1206, where input processing is performed. During the step, the system reads the states of input components such as buttons, the joystick, and tone buttons.

At block 1208, a mode selection routine is executed. The system checks whether a user has requested a change in mode and also processes any MIDI-related events. Once the mode is determined, control flows to block 1210, where audio processing operations are carried out. These include updating volume, applying audio effects, initiating and terminating note playback, and adjusting note velocity.

The program then enters a mode check operation at block 1212. Depending on the active mode, the system branches into one of several defined operational paths. Upon selection of practice mode, control transitions to block 1216, wherein the system tracks event progress, monitors user input, and provides visual feedback. Upon selection of menu mode, block 1218 is executed to handle navigation and selection input. In play mode, block 1220 is activated, managing button event handling, interpreting bellows input, and recording performance data when enabled. Playback mode is represented by block 1214, with associated functional operations detailed in block 1222, wherein the system sequenced through pre-defined events, triggered auto play of notes, and updated the display with animations.

From the four primary modes practice 1216, menu 1218, play 1220, and playback 1214 the system proceeds to display update logic. For example, block 1224 handles updating the display based on current button states, bellows states, and mode information. Similarly, block 1226 provides an intermediate path from menu mode 1218 to the display update function.

Importantly, block 1228 represents additional functional operations within the play mode (1220). The block specifically handles button events, processes bellows input in real time, and performs recording if the record mode is active. The block ensures accurate capture and response to live user interaction during performance.

All functional paths ultimately lead to block 1230, which performs final display updates that reflect the current system state, thereby maintaining real-time feedback to the user.

Figure 13:
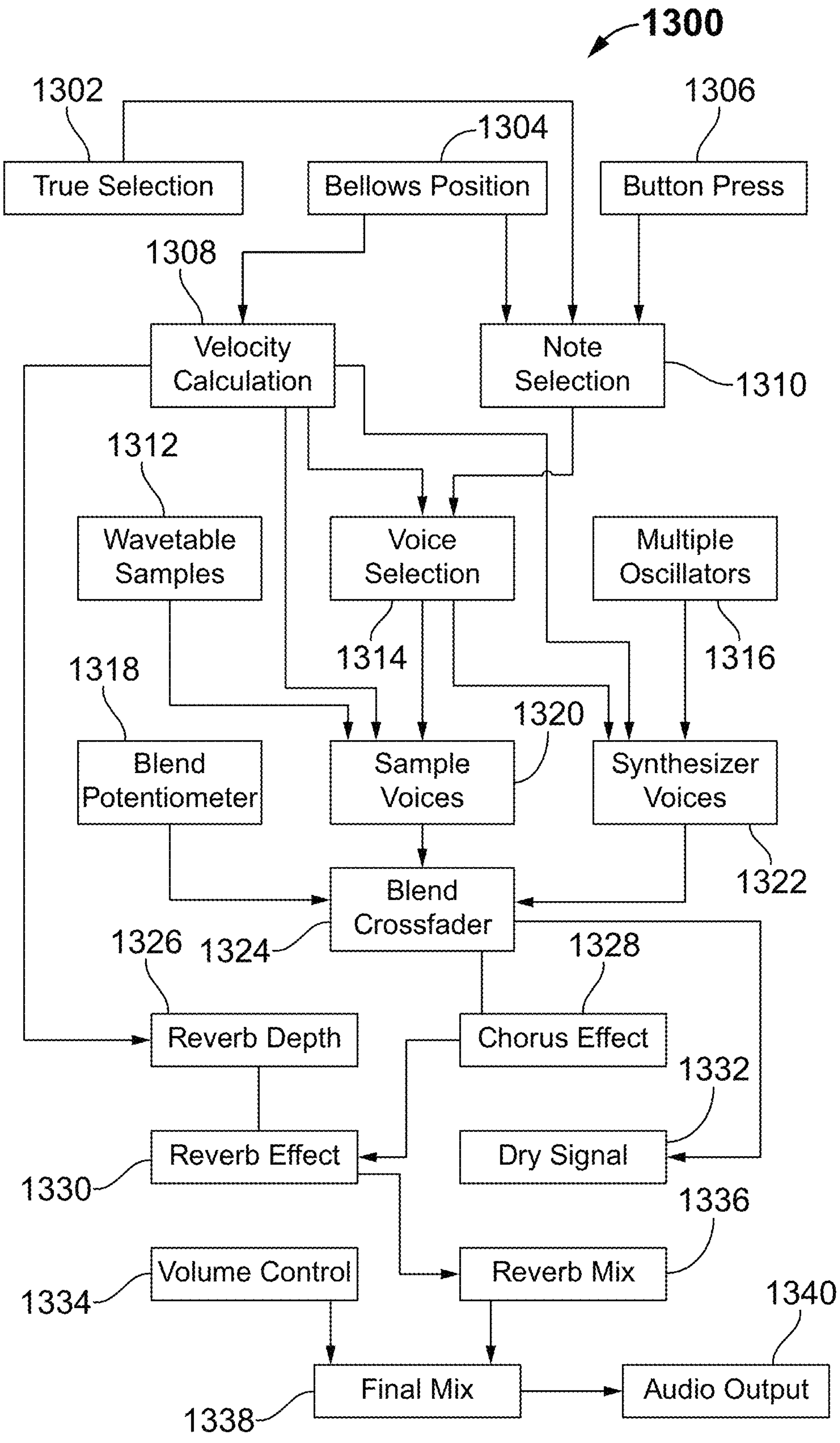
FIG. 13 illustrates an audio signal flow diagram representing the processing sequence for generating audio output in accordance with one embodiment of the present invention.

FIG. 13 illustrates an audio signal flow diagram 1300 representing the processing sequence for generating audio output, in accordance with one embodiment of the present invention.

The signal flow begins with user input sources including tone selection 1302, bellows position 1304, and button press 1306. The inputs collectively inform downstream parameters in the audio engine. Specifically, bellows position 1304 and button press 1306 contribute to velocity calculation 1308, while tone selection 1302 and button press 1306 are used to determine note selection 1310.

The results of note selection 1310 direct the generation of audio from various sound sources. Wavetable samples 1312, voice selection 1314, and multiple oscillators 1316 are each responsive to the calculated inputs and contribute to a hybrid audio synthesis process. Voice selection 1314 governs whether the system outputs sample voices 1320 or synthesizer voices 1322. The system may also utilize a blend potentiometer 1318 to manually adjust the balance between wavetable samples 1312 and other sources, thereby feeding into a blend crossfader 1324.

Blend crossfader 1324 combines the sample voices 1320 and synthesizer voices 1322 according to the blend settings, producing a unified output signal. The combined signal is then sent to a reverb depth control 1326 and a chorus effect module 1328. Reverb depth 1326 modulates the extent of a reverb effect 1330, while chorus effect 1328 adds modulation-based thickness and spatial variation.

The outputs from chorus effect 1328 and reverb effect 1330 are combined with a dry signal 1332. The dry signal 1332 represents the unprocessed core signal that bypasses spatial effects. The components are then routed into respective paths such as a volume control 1334 governs the amplitude of the dry signal, while a reverb mix 1336 balances the dry signal and a reverb effect 1330 to ensure tonal cohesion.

Following mixing and gain adjustments, the processed audio is merged into a final mix 1338. The final mix 1338 is transmitted to audio output 1340, which may comprise a speaker, headphone jack, or digital output interface, thereby completing the audio rendering pipeline.

Accordingly, FIG. 13 outlines modular and flexible audio synthesis architecture suitable for implementation in a digital musical instrument, allowing for dynamic voice shaping, blending, and real-time expressive control through physical input gestures and parameters.

Figure 14:
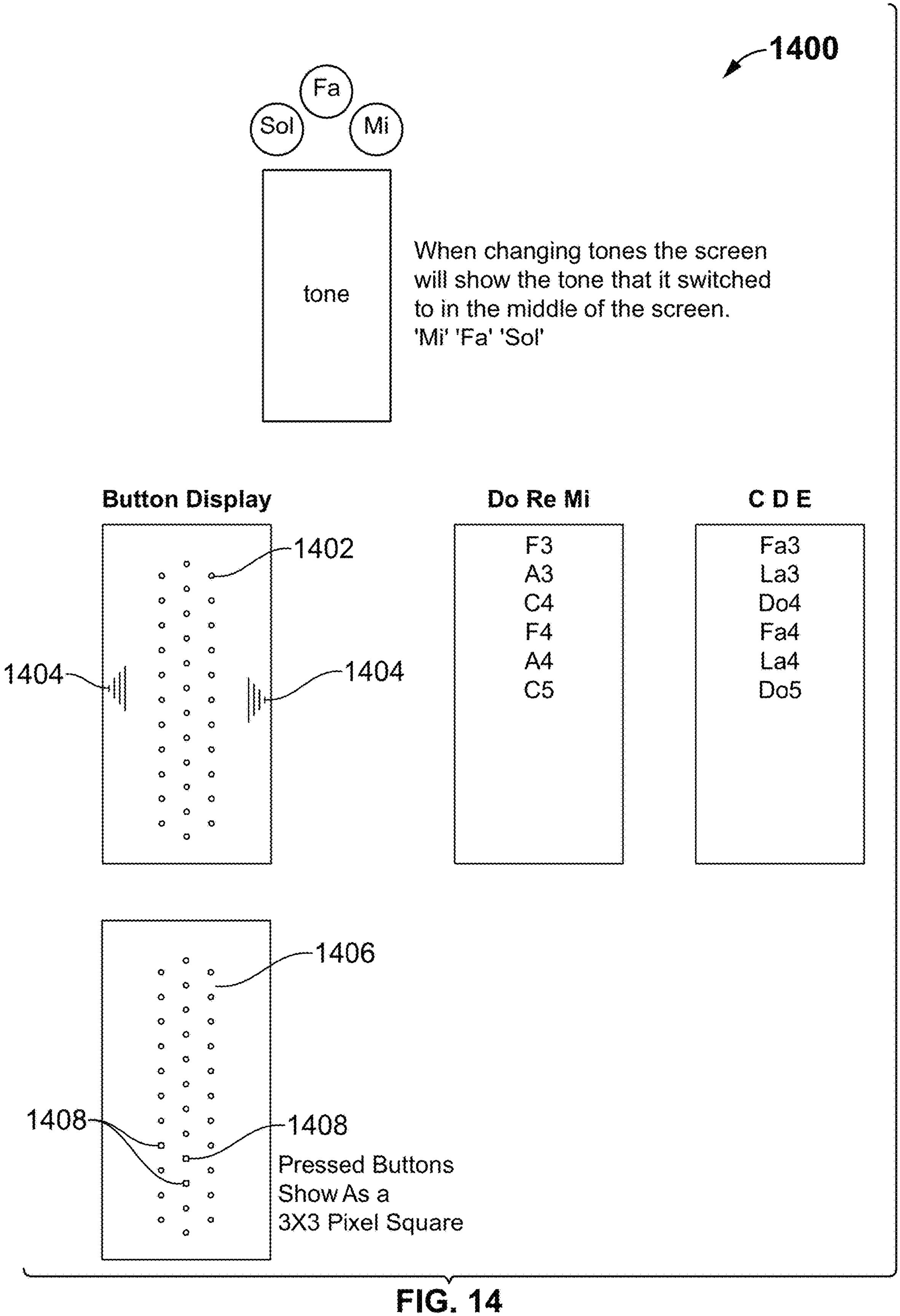
FIG. 14 shows the display interface of the DCORDION instrument, in accordance with one embodiment of the present invention.

FIG. 14 illustrates a display interface 1400 of the digitally enhanced bisonoric instrument that visually represents button activation, tone selection, and note identification, in accordance with one embodiment of the present invention.

The interface includes a tone display module that shows the current tone name (e.g., "Mi", "Fa", or "Sol") in the center of the screen during tone switching. Tone indicators appear as temporary text feedback when the tone is changed by the user.

A button display layout 1402 visually maps each physical button of the instrument to a corresponding dot in the matrix. This layout is active across all operating modes and serves as a consistent visual reference for note input. Bellows movement indicators 1404, indicating a bellows intake or exhale direction are shown as vertical bars or arrows 1404 on either side of the button matrix. Movement of the joystick creates audio reproduction of sound of the bellows on intake of air and exhale of air while playing the instrument.

In response to button activation, a pressed-note display 1406 updates to show a 3×3 pixel square 1408 in the position of each pressed button. This allows the user to visually confirm active notes during play.

Two tone map reference columns are included in the figure. The first column shows notes corresponding to the Do-Re-Mi tone set (e.g., F3, A3, C4), and the second column shows notes for the C-D-E tone set (e.g., Fa3, La3, Do4). These reference lists indicate how the visual display relates to tonal pitch output based on the active mode.

The display supports a maximum of six simultaneous button activations and may show blinking 3×3 indicators in practice mode to guide the user through instructional routines. The entire interface contributes to improving visual feedback and user familiarity in performing or learning the instrument.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean “one and only one” unless specifically so stated, but rather “one or more.” The word “exemplary” is used herein to mean “serving as an example, instance, or illustration.” Any aspect described herein as “exemplary” is not necessarily to be construed as preferred or advantageous over other aspects. Unless specifically stated otherwise, the term “some” refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words “module,” “mechanism,” “element,” “device,” and the like may not be a substitute for the word “means.” As such, no claim element is to be construed as a means plus function unless the element is expressly recited using the phrase “means for.”

The invention claimed is:

1. A digitally enhanced bisonoric instrument, comprising:

a housing;

a matrix of tactile input buttons disposed on a front surface of the housing, each button of the matrix representing a different audio output capable by the instrument;

a joystick mounted to the housing and positioned to be operated by a user during performance, the joystick configured to simulate bisonoric dynamics of the instrument through directional and pressure-based movement;

a microcontroller disposed within the housing and electrically connected to the matrix of tactile input buttons and the joystick, the microcontroller configured to:

detect activation of one or more of the input buttons;

receive directional and pressure-based input signals from the joystick;

generate audio signals corresponding to musical notes of the bisonoric instrument based on the button and joystick inputs thereby generating the audio output.

2. The instrument of claim 1, wherein an audio synthesis module operatively coupled to the microcontroller, the audio synthesis module configured to blend sampled accordion tones with synthesized waveform data to produce a mixed audio output as the sound output.

3. The instrument of claim 2, wherein the audio synthesis module applies audio effects including reverb and chorus to the mixed audio output.

4. The instrument of claim 1, wherein an audio output interface is configured to connect the audio output to an external amplifier, computerized device or speaker system.

5. The instrument of claim 1, wherein the joystick is configured to modulate expression parameters including volume and tone based on directional input and displacement magnitude.

6. The instrument of claim 1, further comprising a blend control potentiometer disposed on the housing and operatively connected to the microcontroller, the blend control potentiometer configured to adjust a ratio between sampled tones of the instrument and synthesized waveforms.

7. The instrument of claim 1, further comprising a volume control potentiometer configured to regulate the overall gain of the audio signal output by the audio output interface.

8. The instrument of claim 1, wherein the matrix of tactile input buttons comprises at least thirty-four individually marked push buttons arranged in a grid format.

9. The instrument of claim 1, wherein the microcontroller is configured to interface with one or more multiplexers that manage input signal routing from the matrix of tactile input buttons.

10. The instrument of claim 1, further comprising a slide switch mounted on the housing and operatively coupled to the microcontroller, the slide switch enabling switching between operating modes.

11. The instrument of claim 1, wherein the microcontroller is configured to generate MIDI signals corresponding to the input buttons selected and transmit the MIDI signals through a digital interface.

12. The instrument of claim 1, further comprising a display module configured to display real-time status of at least tone selection, mode status, menu navigation, bellows direction, note input, and MIDI channel configuration.

13. The instrument of claim 1, wherein the audio synthesis module includes a sound font library comprising multiple tonal styles and presets for a variety of instruments selectable via user input.

* * * * *